United States Patent
Tseng et al.

(10) Patent No.: US 9,569,575 B2
(45) Date of Patent: Feb. 14, 2017

(54) DIGITAL CIRCUIT DESIGN METHOD AND ASSOCIATED COMPUTER PROGRAM PRODUCT

(71) Applicant: Realtek Semiconductor Corp., HsinChu (TW)

(72) Inventors: Shun-Te Tseng, Hsinchu County (TW); Chi-Shun Weng, Hsinchu County (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 14/703,905

(22) Filed: May 5, 2015

(65) Prior Publication Data

US 2016/0078154 A1 Mar. 17, 2016

(30) Foreign Application Priority Data

Sep. 17, 2014 (TW) .............................. 103132136 A

(51) Int. Cl.
*G06F 17/50* (2006.01)
(52) U.S. Cl.
CPC .................... *G06F 17/505* (2013.01)
(58) Field of Classification Search
CPC ...................................................... G06F 17/50

USPC .......................................................... 716/102
See application file for complete search history.

(56) References Cited

U.S. PATENT DOCUMENTS 8,677,306 B1 * 3/2014 Andreev ............... G06F 11/267
714/30

* cited by examiner

*Primary Examiner* — Thuan Do
(74) *Attorney, Agent, or Firm* — Winston Hsu; Scott Margo

(57) ABSTRACT

A digital circuit design method includes: before performing physical design: performing a logic synthesis according to a Register Transfer Level (RTL) design and a plurality of constraints to at least generate a netlist, a standard delay format file and a first constraint file; retrieving information of at least a specific node of circuit from the first constraint file to generate a second constraint file; generating an updated standard delay format file at least according to the standard delay format file and the second constraint file, wherein a delay of the specific node of the updated standard delay format file is less than a delay of the specific node of the standard delay format file; and using the netlist and the updated standard delay format file to perform a pre-post-layout simulation.

11 Claims, 2 Drawing Sheets

DIGITAL CIRCUIT DESIGN METHOD AND ASSOCIATED COMPUTER PROGRAM PRODUCT

BACKGROUND OF THE INVENTION

1. Field of the Invention

The present invention relates to a circuit design, and more particularly, to a digital circuit design method and associated computer program product.

2. Description of the Prior Art

Traditional digital circuit design is mainly categorized into front-end stage and back-end stage, wherein the front-end stage mainly comprises Register Transfer Level (RTL) design, functional simulation and logic synthesis, and the back-end stage comprises physical design, automatic placement and routing, and post-layout simulation, etc.

In general, after the logic synthesis but before the physical design, the functional simulation with the timing delay information is not needed, besides doing this kind of simulation is difficult. For example, in the setting of the logic synthesis, high fan-out nets of the circuit will be annotated with huge delay times in the timing information generated by the logic synthesis, so the netlist generated can't be simulated with the timing information given by the logic synthesis.

The above-mentioned high fan-out net requires extra processes in the following physical design to make the delay time short. However, since the post-layout simulation, executed after the physical design, usually is pretty close to tape out, if the problems are discovered in post-layout simulation, the product schedule may be affected.

For digital design, if the constraint applied in the logic synthesis is correct and sufficient in its coverage, and a correct static timing analysis (STA) is performed accordingly to passes the verification, the post-layout simulation might not have error generally. However, sometimes engineers make mistakes in designing the timing constraints so that the static timing analysis is performed with a timing-loosening constraint and that the errors can not be discovered until the post-layout simulation. Some circuits even can not be checked with static timing analysis, in which case, with current design flow, the error can possibly be discovered only in the post-layout simulation. However, as the abovementioned statements, it's usually too late if this kind of error is discovered after the physical design.

SUMMARY OF THE INVENTION

One of the objectives of the present invention is to provide a digital circuit design method and associated computer program product, which can perform pre-post-layout simulation before physical design to discover potential error of circuit and constraint design in advance and solve the abovementioned problems.

According to an embodiment of the present invention, a digital circuit design method comprises: before performing the physical design: performing logic synthesis according to an RTL design and a plurality of constraints to at least generate a netlist, a standard delay format file and a first constraint file; retrieving the information of at least a specific node from the first constraint file to generate a second constraint file; generating an updated standard delay format file at least according to the standard delay format file and the second constraint, wherein the delay of the specific node of the updated standard delay format file is less than the delay of the specific node of the standard delay format file; and using the netlist and the updated standard delay format file to perform a pre-post-layout simulation.

According to another embodiment, a computer program product for performing digital circuit design is disclosed, wherein when the computer program product is executed by a computer, the computer executes: before physical design: the first program instruction, performing logic synthesis according to an RTL design and a plurality of constraints to at least generate a netlist, a standard delay format file and a first constraint file; the second program instruction, retrieving the information of at least a specific node from the first constraint file to generate a second constraint file; the third program instruction, generating an updated standard delay format file at least according to the standard delay format file and the second constraint file, wherein the delay of the specific node of the updated standard delay format file is less than the delay of the specific node of the standard delay format file; and the fourth program instruction, using the netlist and the updated standard delay format file to perform a pre-post-layout simulation.

According to another embodiment, a digital circuit design method comprises: before performing physical design: performing logic synthesis according to an RTL design and a plurality of constraints to at least generate a netlist, a standard delay format file and an updated standard delay format file, wherein regarding at least a specific node of circuit, the delay of the specific node of the updated standard delay format file is less than the delay of the specific node of the standard delay format file; and using the netlist and the updated standard delay format file to perform a pre-post-layout simulation.

According to another embodiment, a computer program product for performing digital circuit design is disclosed, wherein when the computer program product is executed by a computer, the computer executes: before physical design: the first program instruction, performing logic synthesis according to an RTL design and a plurality of constraints to at least generate a netlist, a standard delay format file and an updated standard delay format file, wherein regarding at least a specific node of circuit, the delay of the specific node of the updated standard delay format file is less than the delay of the specific node of the standard delay format file; and the second program instruction, using the netlist and the updated standard delay format file to perform a pre-post-layout simulation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
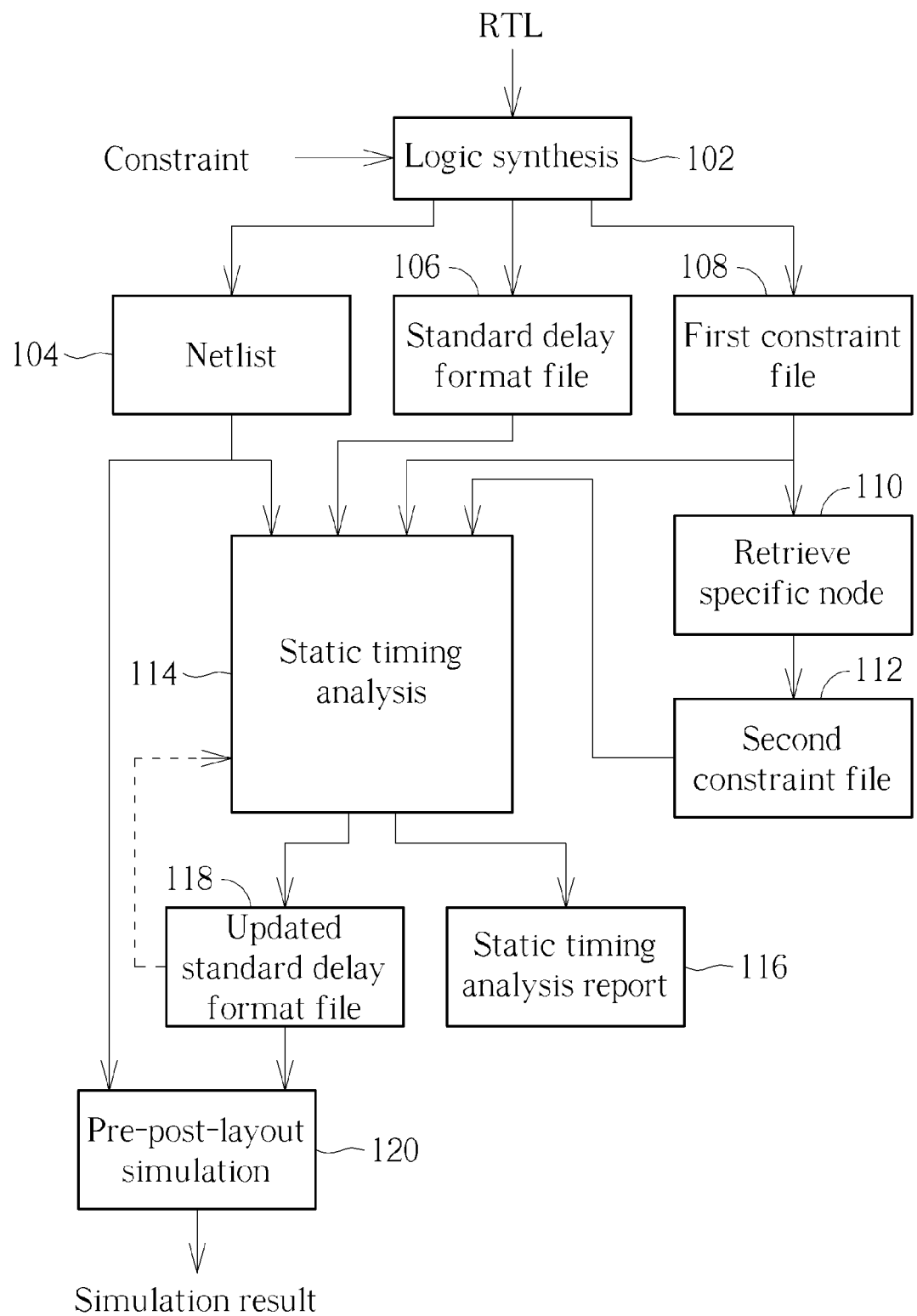
FIG. 1 is a flowchart illustrating the digital circuit design method according to an embodiment of the present invention.

FIG. 1 is a flowchart illustrating a digital circuit design method according to an embodiment of the present invention. In this embodiment, the digital circuit design method is executed by a plurality of program instructions after a computer program product is loaded by a computer/processor. Refer to FIG. 1, the flow of the digital circuit design is described as follows.

First, in step 102, a logic synthesis operation is performed according an RTL design and a plurality of constraints to generate a netlist, a standard delay format (SDF) file and a first constraint file in steps 104, 106 and 108. The above constraints are designed by engineers, and mainly comprise contents such as pins on which clocks of certain frequencies are created for the synchronous digital circuit. The netlist is a kind of file format for describing circuit, which is logically equivalent to the RTL design, and satisfies the constraints given by engineers. The standard delay format file mainly describes delays between circuit units, and delays of interconnections of the circuit, etc. The first constraint file mainly describes the content of the abovementioned constraints, and the information about high fan-out nets of the circuit. In particular, the abovementioned contents about constraint, standard delay format file and the first constraint file is only about the disclosed part of the present invention, the skilled person in the art can understand these files can also comprise other necessary information.

Next, in step 110, information of at least a specific node of circuit is retrieved from the first constraint file. In this embodiment, the specific node is the node that is annotated with a huge delay in logic synthesis, for example, a high fan-out net of circuit. Next, in step 112, the retrieved related information of the specific node is stored as a second constraint file.

Next, in step 114, a static timing analysis is performed according to the netlist, the standard delay format file, the first constraint file and the second constraint file to generate a static timing analysis report and an updated standard delay format file in steps 116 and 118 respectively. More specifically, in the static timing analysis, the static timing analysis is performed according to the netlist, the standard delay format file (or the updated standard delay format file) and the first constraint file to generate static timing analysis report in step 116; and the updated standard delay format file in step 118 is generated at least according to the standard delay format file and the second constraint file, wherein the delay of the specific node of the updated standard delay format file is less than the delay of the specific node of the standard delay format file. In addition, in a program of the static timing analysis of the this embodiment, the delay of the specific node of the standard delay format file is set to be 0 or close to a delay of the specific node after physical design to generate the updated standard delay format file. For example, assuming in the standard delay format file generated in step 106, the delay annotated to a high fan-out net is 100 micro-seconds, and in the updated standard delay format file, the annotated delay is revised to 0 or close to the delay after physical design (e.g. after using clock tree synthesis), for example, 2 nano-seconds.

Next, in step 120, the netlist and the updated standard delay format file are used to perform a pre-post-layout simulation to generate a simulation result which allows the engineer to discover erroneous constraints in step 102.

In particular, the abovementioned steps 102 to 120 are all performed before performing the physical design, therefore if there is any potential problem in circuit or constraint design, it can be discovered at this early stage. Particularly if erroneous constraints are given in step 102, it can be discovered in case the product schedule is affected.

Figure 2:
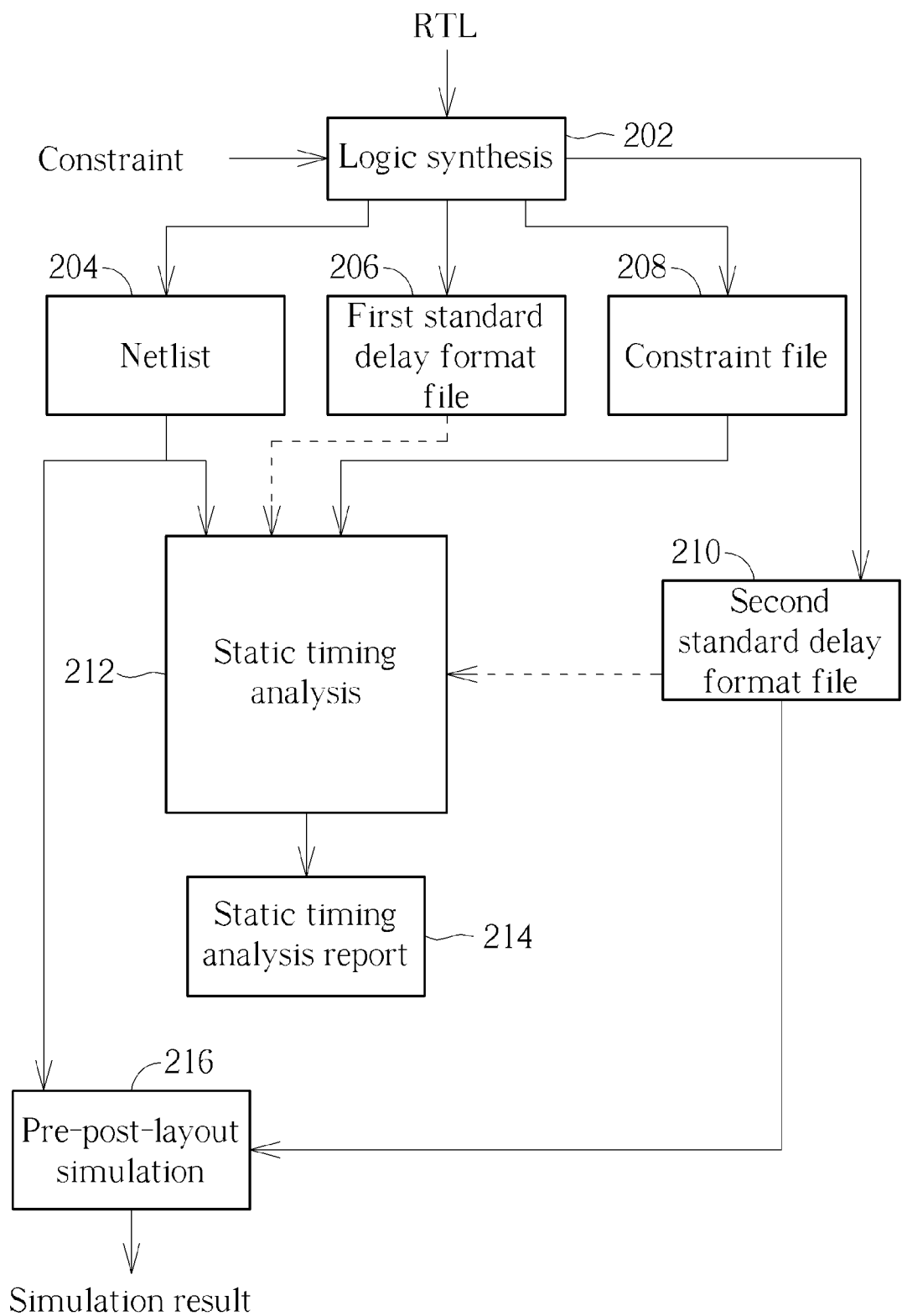
FIG. 2 is a flowchart illustrating the digital circuit design method according to another embodiment of the present invention.

FIG. 2 is a flowchart illustrating a digital circuit design method according to another embodiment of the present invention. In this embodiment, the digital circuit design method is executed by a plurality of program instructions after a computer program product is loaded by a computer/processor. Refer to FIG. 2, the flow of the digital circuit design method is described as follows.

First, in step 202, a logic synthesis operation is performed according an RTL design and a plurality of constraints to generate a netlist, a first standard delay format file and a constraint file in steps 204, 206 and 208. The above constraints is designed by engineers, and mainly comprise contents such as pins on which clocks of certain frequencies are created for the synchronous digital circuit. The netlist is a kind of file format for describing circuit, which is logically equivalent to the RTL design, and satisfies the constraints given by engineers. The first standard delay format file mainly describes delays between circuit units, and delays of interconnections in the circuit, etc. The constraint file mainly describes the content of the abovementioned constraints and information about high fan-out nets of circuit. In particular, the abovementioned contents about constraint, the first standard delay format file and the constraint file is only about the disclosed part of the present invention, the skilled person in the art can understand these files can also comprise other necessary information.

In addition, a second standard delay format file (step 210) is also generated in a program of the logic synthesis performed in step 202, wherein the content of the second standard delay format file is similar to the updated standard delay format file described in the embodiment of FIG. 1, that is the delay of a specific node in the second standard delay format file (e.g. high fan-out net) is less than the delay of a specific node in the first standard delay format file. In this embodiment, the delay of the specific node in the first standard delay format file is set to be 0 or close to the delay of the specific node after the physical design to generate the second standard delay format file. For example, assuming in the first standard delay format file, the delay annotated to a high fan-out net is 100 micro-seconds, then in the second standard delay format file, the delay described by this high fan-out net is revised to be 0 or close to the delay after physical design (e.g. after using clock tree synthesis), for example, 2 nano-seconds.

Next, in step 212, the static timing analysis is performed according to the netlist, the constraint file, and the first or the second standard delay format file to generate the static timing analysis report in step 214.

Next, in step 216, using the netlist and the updated standard delay format file to perform a pre-post-layout simulation to generate a simulation result, which allows engineers to discover potential errors in the plurality of constraints in step 202.

In particular, the abovementioned steps 202 to 216 are all performed before performing physical design therefore if there is any potential problem in circuit and constraint design, it can be discovered at this early stage. Particularly if there is an error in the plurality of constraint in step 202, it can be discovered in case the product schedule is affected.

Briefly summarized, in the digital circuit design method and associated computer program product of the present invention, the pre-post-layout simulation is performed before the physical design to discover the potential problems of circuit design as early as possible in case the product schedule is affected.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A digital circuit design method, comprising:
   before performing a physical design:
   performing a logic synthesis according to a Register Transfer Level (RTL) design and a plurality of constraints to at least generate a netlist, a standard delay format file and a first constraints file;
   retrieving information of at least a specific node of circuit from the first constraint file to generate a second constraint file;
   generating an updated standard delay format file according to at least the standard delay format file and the second constraint file, wherein a delay of the specific node of the updated standard delay format file is less than a delay of the specific node of the standard delay format file; and
   using the netlist and the updated standard delay format file to perform a pre-post-layout simulation.

2. The digital circuit design method of claim 1, wherein the specific node is a high fan-out net of a circuit.

3. The digital circuit design method of claim 1, wherein the step of generating the updated standard delay format file comprises:
   setting the delay of the specific node of the standard delay format file to be 0 or close to a delay of the specific node after a physical design to generate the updated standard delay format file.

4. The digital circuit design method of claim 1, further comprising:
   determining whether the plurality of constraints have error according to the simulation result of the pre-post-layout simulation.

5. A non-transitory computer readable medium storing program instructions for performing a digital circuit design, wherein when loaded and executed by a processor, the program instructions instruct the processor to execute following steps:
   before performing a physical design:
   performing logic synthesis according to a Register Transfer Level (RTL) design and a plurality of constraints to at least generate a netlist, a standard delay format file and a first constraints file;
   retrieving information of at least a specific node of circuit from the first constraint file to generate a second constraint file;
   generating an updated standard delay format file according to at least the standard delay format file and the second constraint file, wherein a delay of the specific node of the updated standard delay format file is less than a delay of the specific node of the standard delay format file; and
   using the netlist and the updated standard delay format file to perform a pre-post-layout simulation.

6. The computer program product of claim 5, wherein the specific node is a high fan-out net of a circuit.

7. The computer program product of claim 5, wherein the step of generating the updated standard delay format file in the third program instruction comprises:
   setting a delay of the specific node of the standard delay format file to be 0 or close to a delay of the specific node after a physical design to generate the updated standard delay format file.

8. A digital circuit design method, comprising:
   before performing a physical design:
   performing a logic synthesis according to a Register Transfer Level (RTL) design and a plurality of constraints to at least generate a netlist, a first standard delay format file and a second standard delay format file, wherein regarding at least a specific node of a circuit, a delay of the specific node in the second standard delay format file is less than a delay of the specific node in the first standard delay format file; and
   using the netlist and the second standard delay format file to perform a pre-post-layout simulation.

9. The digital circuit design method of claim 8, wherein the specific node is a high fan-out net of the circuit.

10. The digital circuit design method of claim 8, wherein the step of generating the second standard delay format file comprises:
    setting the delay of the specific node in the first standard delay format file to be 0or close to a delay of the specific node after a physical design to generate the second standard delay format file.

11. The digital circuit design method of claim 8, further comprising:
    determining whether the constraints contain errors according to the simulation result of the pre-post-layout simulation.

* * * * *